United States Patent
Kajitani et al.

(10) Patent No.: US 9,176,809 B2
(45) Date of Patent: Nov. 3, 2015

(54) TIME INFORMATION OBTAINING DEVICE AND RADIO-CONTROLLED TIMEPIECE

(71) Applicant: CASIO COMPUTER CO., LTD., Shibuya-ku, Tokyo (JP)

(72) Inventors: Haruo Kajitani, Akiruno (JP); Takashi Sano, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 82 days.

(21) Appl. No.: 14/077,030

(22) Filed: Nov. 11, 2013

(65) Prior Publication Data

US 2014/0164885 A1  Jun. 12, 2014

(30) Foreign Application Priority Data

Dec. 10, 2012 (JP) .................................. 2012-269216

(51) Int. Cl.
*G06F 11/00* (2006.01)
*G06F 11/08* (2006.01)
*G06F 11/10* (2006.01)
*G04R 20/06* (2013.01)
*H04L 1/00* (2006.01)
*G04R 20/04* (2013.01)

(52) U.S. Cl.
CPC ................ *G06F 11/10* (2013.01); *G04R 20/04* (2013.01); *G04R 20/06* (2013.01); *H04L 1/0061* (2013.01)

(58) Field of Classification Search
CPC ....... H04L 1/006; H04L 1/0083; H04L 1/004; H04L 1/0061; G06F 11/10; G06F 11/1076; G06F 11/183; G06F 11/184; G04R 20/06; G04R 20/04

USPC ......... 714/800, 801, 803, 797, 819, 746, 758, 714/752, 6.24, 52; 326/11, 35
See application file for complete search history.

(56) References Cited

U.S. PATENT DOCUMENTS

| | | | |
|---|---|---|---|
| 8,385,156 B2 * | 2/2013 | Ozawa | 368/46 |
| 8,665,674 B2 * | 3/2014 | Someya | 368/47 |
| 8,677,213 B2 * | 3/2014 | Mizushima | 714/763 |
| 2002/0056065 A1 * | 5/2002 | Jung et al. | 714/758 |
| 2015/0006991 A1 * | 1/2015 | Won et al. | 714/755 |

FOREIGN PATENT DOCUMENTS

JP             11-304973 A       11/1999

\* cited by examiner

*Primary Examiner* — Christine Tu
(74) *Attorney, Agent, or Firm* — Holtz, Holtz, Goodman & Chick PC

(57) ABSTRACT

A time information obtaining device and a radio-controlled timepiece are shown. According to one implementation, the time information obtaining device includes the following. A code identifying section identifies each code of a code string in a radio wave. A first portion parity calculating section calculates a portion parity where a parity bit of a variable code is subtracted from a parity code showing a parity bit for a code string portion. A first portion parity deciding section decides a portion parity based on a calculated number of portion parities. A second portion parity deciding section obtains a portion parity from an invariable code other than the variable code. A parity confirming section confirms a match between the portion parities decided by the first portion parity deciding section and the second portion parity deciding section.

20 Claims, 5 Drawing Sheets

FIG.2

| SECOND | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| JJY | P | 40m | 20m | 10m | 0 | 8m | 4m | 2m | 1m | P1 | 0 | 0 | 20h | 10h | 0 | 8h | 4h | 2h | 1h | P2 | 0 | 0 | 200d | 100d | 0 | 80d | 40d | 20d | 10d | P3 |
|  | MARKER | 10 MINUTE UNIT DIGIT | | | EXTENDED | 1 MINUTE UNIT DIGIT | | | | MARKER | EXTENDED | | 10 HOUR UNIT DIGIT | | EXTENDED | 1 HOUR UNIT DIGIT | | | | MARKER | EXTENDED | | 100 DAY UNIT DIGIT | | EXTENDED | 10 DAY UNIT DIGIT | | | | MARKER |

| SECOND | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 |
|---|---|---|---|---|---|---|---|---|---|---|---|---|---|---|---|---|---|---|---|---|---|---|---|---|---|---|---|---|---|---|
| JJY | 8d | 4d | 2d | 1d | 0 | 0 | PA1 | PA2 | SU1 | P4 | SU2 | 80y | 40y | 20y | 10y | 8y | 4y | 2y | 1y | P5 | 4w | 2w | 1w | LS1 | LS2 | 0 | 0 | 0 | 0 | P0 |
|  | 1 DAY UNIT DIGIT | | | | EXTENDED | | HOUR PARITY | MINUTE PARITY | | MARKER | | 10 YEAR UNIT DIGIT | | | | 1 YEAR UNIT DIGIT | | | | MARKER | DAY OF WEEK | | | LEAP SECOND | | EXTENDED | | | | MARKER |

FIG.3A

| SECOND | 5 | 6 | 7 | 8 | 5 | 6 | 7 | 8 | 5 | 6 | 7 | 8 |
|---|---|---|---|---|---|---|---|---|---|---|---|---|
| CODE | 0 | 0 | 0 | 0 | 0 | 0 | 0 | 1 | 0 | 0 | 1 | 0 |
| MINUTE | | | | 0 | | | | 1 | | | | 2 |

FIG.3B

| SECOND | 5 | 6 | 7 | 8 | 5 | 6 | 7 | 8 | 5 | 6 | 7 | 8 |
|---|---|---|---|---|---|---|---|---|---|---|---|---|
| CODE | 0 | 0 | 0 | 1 | 0 | 0 | 1 | 0 | 0 | 0 | 1 | 1 |
| MINUTE | | | | 1 | | | | 2 | | | | 3 |

FIG.3C

| SECOND | 5 | 6 | 7 | 8 | 5 | 6 | 7 | 8 | 5 | 6 | 7 | 8 |
|---|---|---|---|---|---|---|---|---|---|---|---|---|
| CODE | 0 | 0 | 1 | 0 | 0 | 0 | 1 | 1 | 0 | 1 | 0 | 0 |
| MINUTE | | | | 2 | | | | 3 | | | | 4 |

FIG.3D

| SECOND | 5 | 6 | 7 | 8 | 5 | 6 | 7 | 8 | 5 | 6 | 7 | 8 |
|---|---|---|---|---|---|---|---|---|---|---|---|---|
| CODE | 0 | 0 | 1 | 1 | 0 | 1 | 0 | 0 | 0 | 1 | 0 | 1 |
| MINUTE | | | | 3 | | | | 4 | | | | 5 |

FIG.3E

| SECOND | 5 | 6 | 7 | 8 | 5 | 6 | 7 | 8 | 5 | 6 | 7 | 8 |
|---|---|---|---|---|---|---|---|---|---|---|---|---|
| CODE | 0 | 1 | 0 | 0 | 0 | 1 | 0 | 1 | 0 | 1 | 1 | 0 |
| MINUTE | | | | 4 | | | | 5 | | | | 6 |

FIG.3F

| SECOND | 5 | 6 | 7 | 8 | 5 | 6 | 7 | 8 | 5 | 6 | 7 | 8 |
|---|---|---|---|---|---|---|---|---|---|---|---|---|
| CODE | 0 | 1 | 0 | 1 | 0 | 1 | 1 | 0 | 0 | 1 | 1 | 1 |
| MINUTE | | | | 5 | | | | 6 | | | | 7 |

FIG.3G

| SECOND | 5 | 6 | 7 | 8 | 5 | 6 | 7 | 8 | 5 | 6 | 7 | 8 |
|---|---|---|---|---|---|---|---|---|---|---|---|---|
| CODE | 0 | 1 | 1 | 0 | 0 | 1 | 1 | 1 | 1 | 0 | 0 | 0 |
| MINUTE | | | | 6 | | | | 7 | | | | 8 |

FIG.3H

| SECOND | 5 | 6 | 7 | 8 | 5 | 6 | 7 | 8 | 5 | 6 | 7 | 8 |
|---|---|---|---|---|---|---|---|---|---|---|---|---|
| CODE | 0 | 1 | 1 | 1 | 1 | 0 | 0 | 0 | 1 | 0 | 0 | 1 |
| MINUTE | | | | 7 | | | | 8 | | | | 9 |

FIG.3I

| SECOND | 5 | 6 | 7 | 8 | 5 | 6 | 7 | 8 | 5 | 6 | 7 | 8 |
|---|---|---|---|---|---|---|---|---|---|---|---|---|
| CODE | 1 | 0 | 0 | 0 | 1 | 0 | 0 | 1 | 0 | 0 | 0 | 0 |
| MINUTE | | | | 8 | | | | 9 | | | | 0 |

FIG.3J

| SECOND | 5 | 6 | 7 | 8 | 5 | 6 | 7 | 8 | 5 | 6 | 7 | 8 |
|---|---|---|---|---|---|---|---|---|---|---|---|---|
| CODE | 1 | 0 | 0 | 1 | 0 | 0 | 0 | 0 | 0 | 0 | 0 | 1 |
| MINUTE | | | | 9 | | | | 0 | | | | 1 |

FIG.4

| MINUTE | CODE STRING | | | | P |
|---|---|---|---|---|---|
| 0 | 0 | 0 | 0 | 0 | 0 |
| 1 | 0 | 0 | 0 | 1 | 1 |
| 2 | 0 | 0 | 1 | 0 | 1 |
| 3 | 0 | 0 | 1 | 1 | 0 |
| 4 | 0 | 1 | 0 | 0 | 1 |
| 5 | 0 | 1 | 0 | 1 | 0 |
| 6 | 0 | 1 | 1 | 0 | 0 |
| 7 | 0 | 1 | 1 | 1 | 1 |
| 8 | 1 | 0 | 0 | 0 | 1 |
| 9 | 1 | 0 | 0 | 1 | 0 |

TIME INFORMATION OBTAINING DEVICE AND RADIO-CONTROLLED TIMEPIECE

BACKGROUND OF THE INVENTION

1. Field of the Invention

The present invention relates to a time information obtaining device and a radio-controlled timepiece including the above time information obtaining device.

2. Description of the Related Art

Conventionally, there is an electronic timepiece (radio-controlled timepiece) which includes a function to receive a standard radio wave which is a radio wave in a long wavelength band to transmit time information and which deciphers the time data to calibrate the present time. In such radio-controlled timepiece, the radio wave is received and the time is calibrated automatically at a predetermined cycle (for example, once a day). Therefore, it is possible to maintain the accurate time display without the user manually calibrating the time.

As the standard radio wave, in addition to JJY (40 kHz, 60 kHz) transmitted in Japan, WWVB (60 kHz) of the United States, MSF (60 kHz) of the United Kingdom, DCF77 (77.5 kHz) of Germany and the like are used. In such standard radio wave, the signal showing the time information is amplitude modulated, and the signal is output each minute at a cycle (frame) of 60 seconds. The signal showing the time information is composed of a plurality of codes arranged according to a predetermined format determined for each standard radio wave transmitting station. The signals showing the codes are output one for each second synchronized with the timing of the beginning of each second. In the radio-controlled timepiece, after the signal is demodulated from the received standard radio wave, the signal is decoded according to the format of the standard radio wave to obtain information of the date and time.

The radio wave in the long wavelength band is transmitted long distances. Therefore, it is possible to receive the standard radio wave throughout a wide range. However, when noise is generated in various places, the noise overlaps with the standard radio wave and is received with the standard radio wave. Moreover, the radio wave attenuates inside a building made of a steel frame or reinforced concrete. Therefore, various techniques are employed to enhance lack of reception intensity and to remove influence of noise so as to obtain time data accurately and securely.

As one of such techniques, typically, the radio-controlled timepiece performs processing to obtain a plurality of pieces of time information from the code string of the plurality of frames and to confirm the consistency among the obtained pieces of time information. Japanese Patent Application Laid-Open Publication No. H11-304973 discloses a technique which divides each frame into blocks showing year, date, day of week, hour, and minute according to a code array format of the transmitting station, and confirms consistency among the plurality of frames of the obtained pieces of time information for each block. For the block in which the frames are not consistent, the standard radio wave is received and the consistency of the time information is confirmed repeatedly until consistency is confirmed.

Alternatively, standard radio waves such as JJY, MSF, and DCF77 include parity data in the time information, and the consistency between the deciphered time data and the parity data can be confirmed.

However, when there is relatively a lot of noise or the radio wave reception intensity is not strong enough, a misidentified code may be mixed in the code string of the frame, and it is not possible to obtain accurate time information for a plurality of frames. In view of the above, the inventors of the present invention developed a method to decide the plausible code by majority of the codes in the same position of the code string determined and obtained for a plurality of frames. However, when the above method is used, since the value of the code regarding one minute unit digit data and the code regarding the parity data including the above code changes for each frame, the code cannot be decided by the majority. Therefore, it is not possible to confirm the accuracy of the time information by consistency of the parity value.

The present invention is a time information obtaining device and a radio-controlled timepiece which can confirm accuracy of time information more easily and more effectively.

SUMMARY OF THE INVENTION

According to an aspect of the present invention, there is provided a time information obtaining device which receives a radio wave including time information to obtain time information, the time information obtaining device including:

a code identifying section which identifies each code of a code string showing the time information in the received radio wave;

a first portion parity calculating section which calculates a portion parity wherein a parity bit of a variable code which may change among a predetermined number of 3 or more code strings among codes of a predetermined code string portion of the code string is subtracted from a parity code included in the code string, the parity code showing a parity bit for the predetermined code string portion of the code string;

a first portion parity deciding section which decides a portion parity based on a predetermined number of portion parities calculated from the predetermined number of code strings by the first portion parity calculating section;

a second portion parity deciding section which obtains a portion parity from an invariable code other than the variable code among codes of the code string portion of the predetermined number of code strings; and a parity confirming section which confirms a match between a portion parity decided by the first portion parity deciding section and a portion parity obtained by the second portion parity deciding section.

BRIEF DESCRIPTION OF THE DRAWINGS

The present invention and the above-described objects, features and advantages thereof will become more fully understood from the following detailed description with the accompanying drawings and wherein;

FIG. 2 is a diagram describing code array of one frame data of JJY;

FIG. 3A to FIG. 3J are diagrams each showing a model array pattern of a code showing a one minute unit digit for 3 frames;

FIG. 4 is a diagram showing a one minute unit digit parity value; and

DETAILED DESCRIPTION OF THE PREFERRED EMBODIMENTS

Below, an embodiment of the present invention is described with reference to the drawings.

Figure 1:
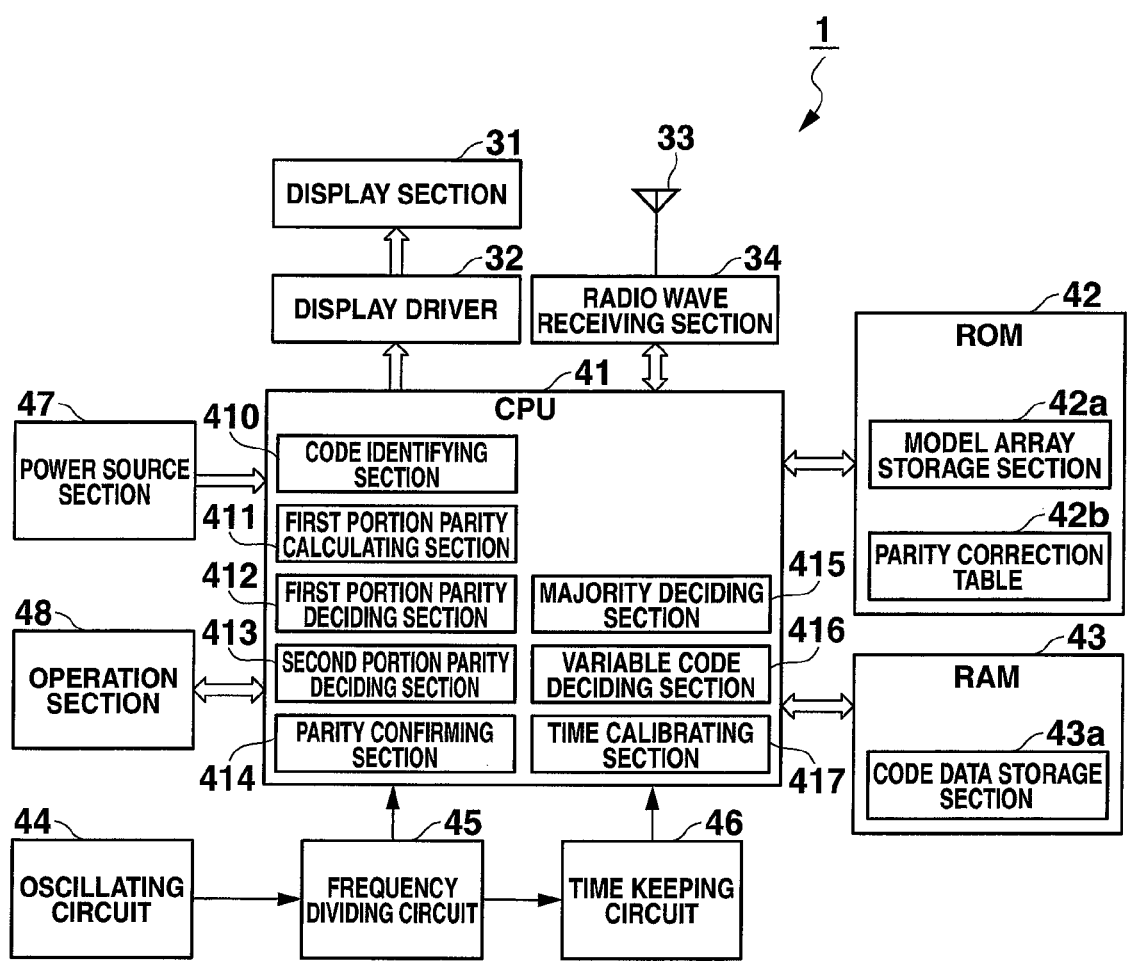
FIG. 1 is a block diagram showing an internal configuration of an electronic timepiece of an embodiment of the present invention.

FIG. 1 is a block diagram showing an internal configuration of an electronic timepiece 1 of an embodiment of the present invention.

The electronic timepiece 1 is a radio-controlled timepiece which can receive a standard radio wave to calibrate the time. The electronic timepiece 1 can be a portable watch or a pocket watch, or a table clock or a wall clock.

The electronic timepiece 1 includes a display section 31 (time display section), a display driver 32 which drives the display section 31, an antenna 33, a radio wave receiving section 34 which receives a radio wave through the antenna 33, a CPU (Central Processing Unit) 41 (a code identifying section 410, a first portion parity calculating section 411, a first portion parity deciding section 412, a second portion parity deciding section 413, a parity confirming section 414, a majority deciding section 415, a variable code deciding section 416, and a time calibrating section 417), a ROM (Read Only Memory) 42, a RAM (Random Access Memory) 43, an oscillating circuit 44, a frequency dividing circuit 45, a time keeping circuit 46 (time keeping section), a power source section 47, an operation section 48, and the like.

For example, the display section 31 is a digital display section including a liquid crystal display screen of a dot matrix type, and the display driver 32 is a liquid crystal display driver. The display section 31 can use a liquid crystal display screen of a segmented method or can use other digital display types such as an organic EL (electro-luminescent) display. In the above cases, various drivers driven in a method corresponding to the display method of the display section 31 are used as the display driver 32. Alternatively, the electronic timepiece 1 can be an analog display type electronic timepiece including a rotating disk and a plurality of needles provided to be able to rotate freely on a dial face as the display section 31. The above can be rotated through an array of gears driven by a step motor.

The antenna 33 and the radio wave receiving section 34 receive a radio wave with a long wavelength band, amplify and detect an amplitude modulated wave and demodulates a signal from the standard radio wave including time information. The radio wave receiving section 34 is configured to be able to synchronize with the reception frequency selected from among the frequencies of the plurality of standard radio waves set in advance. The radio wave receiving section 34 can be configured to include a comparator or an ADC (analog/digital convertor) to binaraize the obtained signal to a high-level signal or a low-level signal to output a predetermined sampling frequency (for example, 64 Hz) to the CPU 41.

The CPU 41 performs various calculating processing and centrally controls the entire operation of the electronic timepiece 1. When the electronic timepiece 1 is started, the CPU 41 reads a control program from the ROM 42 and executes the program. With this, the CPU 41 performs processing regarding continuously counting the time and displaying the time. Moreover, the CPU 41 operates the radio wave receiving section 34 at a regular interval such as once a day to receive the standard radio wave, deciphers and obtains the present time information, and calibrates the time of the electronic timepiece 1. The time information obtaining device is composed of such CPU 41, the above described antenna 33, and the radio wave receiving section 34.

Various programs and setting data are stored in the ROM 42. Included in the various programs is a decrypting program to decode the demodulated standard radio wave signal to obtain accurate time information. The ROM 42 includes a model array storage section 42a which stores a model array to calculate a degree of match with the code string showing one minute unit digit obtained from the code string data (frame data) of three consecutive minutes and a parity correction table 42b for correcting the value of a minute parity based on the value of the one minute unit digit.

The RAM 43 provides a work memory space in the CPU 41 and stores temporary data. The RAM 43 includes a code data storage section 43a which can store code data for a plurality of identified frames.

The oscillating circuit 44 is a circuit which generates and outputs a frequency signal, and for example, a crystal oscillator is used. The frequency dividing circuit 45 divides and outputs a signal input from the oscillating circuit 44 to a signal with a frequency used in each section such as the CPU 41 and the time keeping circuit 46. The time keeping circuit 46 counts the number of times a predetermined frequency signal is input from the frequency dividing circuit 45 and adds the number to a preset initial time to count the present time.

The power source section 47 supplies predetermined electric power necessary for the operation of the CPU 41 and the display driver 32. For example, the power source section 47 includes a solar battery or a secondary battery and is able to supply electric power continuously for a long period of time.

The operation section 48 includes a pressing button or a winding crown to accept operation from outside. The accepted operation is converted to an electric signal, and the electric signal is output to the CPU 41. The display screen of the display section 31 may be used as a touch panel together with the operation section 48.

Next, the procedure of how the electronic timepiece 1 of the present embodiment obtains the time information from the standard radio wave signal is described.

In the example described below, the time information is obtained from the standard radio wave signal of JJY.

According to JJY, the time information is represented by three types of codes (time code) showing "0", "1", and "P" in an array according to a predetermined format, and the code array signal showing the time information is modulated and transmitted. The three types of codes are distinguished according to the length of the term (high level term) with a large amplitude which is started synchronized with the start of the timing of each second (second synchronizing point). In other words, the code "0" is shown when a term with a predetermined amplitude continues for 0.8 seconds and then a term with an amplitude of 10% of the above amplitude (low level term) continues for 0.2 seconds. The code "1" is shown when a term with a predetermined amplitude continues for 0.5 seconds and then a term with an amplitude of 10% of the above amplitude continues for 0.5 seconds. The code "P" is shown when a term with a predetermined amplitude continues for 0.2 seconds and then a term with an amplitude of 10% of the above amplitude continues for 0.8 seconds. It is possible to read which one of the above the code is by identifying the length of the term with the large amplitude and the timing that the amplitude changes to the small state in each second of the demodulated signal. A code string for 1 frame in which 60 identified codes showing 60 seconds are arranged is decoded to obtain the time information.

FIG. 2 is a diagram describing a code array of data of 1 frame of JJY and a diagram describing an identifying method of the code based on plurality of pieces of frame data.

In the standard radio wave of JJY, the code "P" is transmitted fixed as a position marker showing a timing when the value of the one second unit digit is "9" and as a marker showing a timing of the start of each minute (00 seconds). The array of the codes "0" and "1" transmitted in other timing show the specific content of the time information. Binary Coded Decimal is used for the display of the value of the time and date, the values showing ten minute unit digit, one minute unit digit, ten hour unit digit, one hour unit digit, hundred day unit digit, ten day unit digit, one day unit digit, ten year unit digit and one year unit digit are each shown binary of 2 to 4 bits. For example, the value of the ten minute unit digit (0 to 5) in the time of a certain minute is shown by the array of code data of 3 codes transmitted in 1 to 3 seconds of each minute (3 bit data), and the value of the one minute unit digit (0 to 9) in the time of a certain minute is shown by an array of code data of four codes transmitted in 5 to 8 seconds of each minute (4 bit data).

As other contents of time information there are day of week, parity data for checking data, information showing when a leap second is inserted, and extended blocks for future use such as summer time information. Among the above, as the parity data, in the JJY, hour parity data of a total of 6 codes showing the ten hour unit digit and the one hour unit digit, and minute parity data (parity code) of a total of 7 codes (predetermined code string portion) showing the ten minute unit digit and the one minute unit digit are each transmitted at 36 and 37 seconds of each minute.

When the time information is obtained, if a misidentified code is included in a frame, the time information decoded and obtained may also be inaccurate. Therefore, in the electronic timepiece 1, after the time information for a plurality of frames is obtained, the time information of each frame is compared and the consistency is confirmed to determine whether a misidentified code is included in the data of each frame.

Even if there is no consistency in the code of the extended block, there is no influence on the date and time to be obtained. Therefore, the accurate identification of all codes is not necessarily demanded in the confirmation of consistency.

According to the electronic timepiece 1 of the present embodiment, one among the plurality of pieces of obtained time information is obtained based on the data of the plurality of frames. Specifically, in the code string data of a predetermined number of frames such as 3 frames, the code of each position is decided by majority among the 3 codes identified in the same position of each frame, and the majority code string is generated. In other words, even if 1 misidentified code is included in the 3 codes identified in the same position, if the other 2 codes are identified correctly, the correct code can be obtained.

Here, there is a difference of 2 minutes between the time information regarding the code string of the first frame and the time information regarding the code string of the third frame. Therefore, among the code strings, at least the code string showing the value of the one minute unit digit (5 to 8 seconds) (variable code) and the code showing the value of the minute parity (37 seconds) may be a code different in each frame. Therefore, such codes are not decided by simple majority, and different processing is performed.

When the one minute unit digit of the time information regarding the code string of the first frame is "8" or "9", the code string portion of the ten minute unit digit or above may change in the code strings of the 3 frames. However, in the electronic timepiece 1, for the purpose of simplifying the processing, the time information is obtained excluding such examples.

In the electronic timepiece 1 of the present embodiment, first, a model array arranging in order a total of 12 codes showing an array of a value of the one minute unit digit which may appear in consecutive three minutes, in other words, ten types of code arrays in which the value of the one minute unit digit in the first frame is any of 0 to 9 is stored in advance in the model array storage section 42a. Then, the degree of match between the array of the 12 codes actually identified (variable code string) and the model arrays, in other words, the number of codes which match are calculated. Then, the value of the one minute unit digit according to the model array with the most matching codes is decided to be the one minute unit digit of the time obtained from the code string of the 3 frames. Although it is not limited to which of the time information of the 3 frames the one minute unit digit is decided to correspond to, the corresponding time information is set in advance.

FIG. 3A to FIG. 3J are diagrams showing a model array pattern of codes showing a one minute unit digit for 3 frames.

When the value of the one minute unit digit is the minute of 0, 1, and 2, the 4-bit code array showing the one minute unit for 3 frames is "(0, 0, 0, 0), (0, 0, 0, 1), (0, 0, 1, 0)". When the degree of match between the above array and the 10 types of model arrays shown in FIG. 3A to FIG. 3J is sought, the array perfectly matches with the array of the 12 codes of minutes 0 to 2 shown in FIG. 3A. Therefore, it is possible to decide that the value of the one minute unit digit of the 3 minutes is 0 to 2.

Here, when there are 2 misidentified codes among the 12 codes, there is a possibility that the correct value of the one minute unit digit cannot be obtained. In other words, it is possible to accurately obtain time information when the mistaken code is 1 mistaken code among 12 codes or the frequency of error is a frequency which corresponds to 4 mistaken codes among 56 codes.

When there are 2 or more codes which do not match between the identified code array and the model array with the highest degree of match, it is possible to judge based on other conditions whether to perform the remaining processing considering that the obtained value is correct or to obtain predetermined frame data again to obtain time data. For example, it is possible to set the processing so that, when among the other 56 codes, the number of codes decided by a majority of 2 to 1 is a predetermined number or more, or when the 3 codes identified in the same position are all different, the time information is considered invalid due to too many errors, and the processing regarding obtaining the time information is performed again from the beginning. When the degree of match is highest between the model array shown in FIG. 3I and FIG. 3J, as described above, the code array portion of the ten minute unit digit or above changes among the 3 frames. Therefore, in this case also it is possible to perform the processing regarding obtaining the time information again from the beginning or to change the processing to perform the data processing of the frame in which the one minute unit digit is "0".

When the value of the one minute unit digit of the time information shown by each frame is decided, next, the value of the minute parity is calibrated. Here, the value of the minute parity is the remainder of the sum of the value of the 7 codes showing the ten minute unit digit and the one minute unit digit divided by 2, in other words, the value of the least significant bit of the binary data showing the added value of the 7 codes. Therefore, the minute parity value is an odd parity which is "1" when there are an odd number of codes "1" in the 7 codes, and "0" when there are an even number of codes "1".

In the binary coded decimal display, the value of the ten minute unit digit and the value of the one minute unit digit are each shown separately, and the value of the minute parity is the parity value which is the sum of the parity value regarding the 3 codes (invariant code) of the ten minute unit digit and the parity value regarding the 4 codes of the one minute unit digit. Therefore, the value of the ten minute unit digit parity (portion parity) can be obtained from the value of the minute parity and the value of the one minute unit digit parity.

FIG. 4 is a diagram showing the code array showing the one minute unit digit and the one minute unit digit parity value.

When the one minute unit digit is "0", "3", "5", "6", or "9", an even number (including 0) of codes "1" are included in the 4 codes included in the code string, and the one minute unit digit parity value is "0". Alternatively, when the one minute unit digit is "1", "2", "4", "7", or "8", an odd number of codes "1" are included in the 4 codes included in the code string, and the one minute unit digit parity value is "1".

As described above, when the one minute unit digit parity value is obtained, the ten minute unit digit parity value can be obtained by subtracting the one minute unit digit parity value from the minute parity value regarding the code of the identified minute parity. In other words, other than the case of FIG. 3I and FIG. 3J, it is possible to obtain the same ten minute unit digit parity value by subtracting the one minute unit digit parity value corresponding to the one minute unit digit value obtained for each frame from the minute parity value of the obtained 3 frames. In the electronic timepiece 1 of the present embodiment, the consistency (match) is confirmed by comparing the ten minute unit digit parity value obtained as described above with the ten minute unit digit parity value calculated using the codes decided as showing the ten minute unit digit value.

Next, the operation to obtain the time information performed in the electronic timepiece 1 is described.

Figure 5:
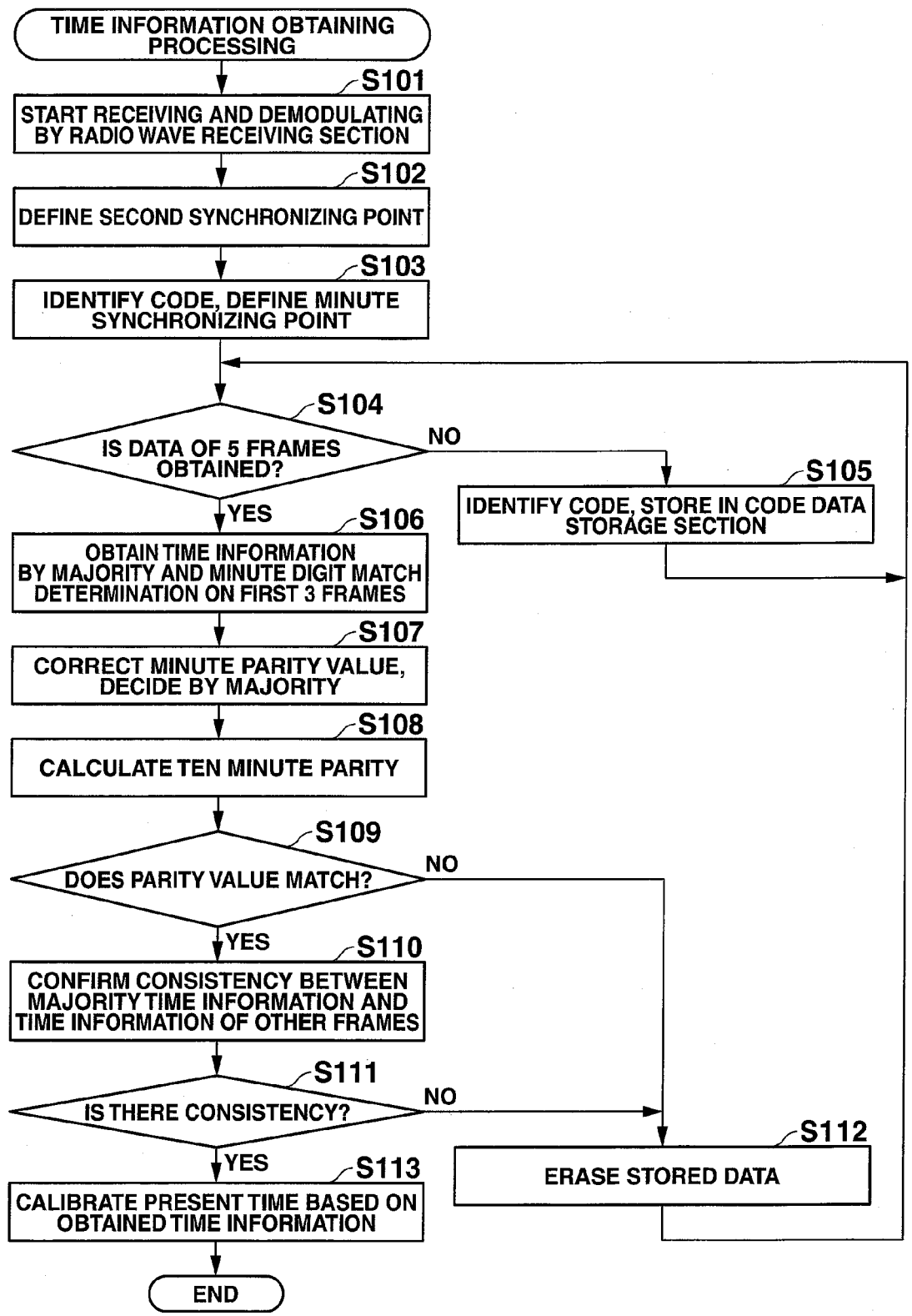
FIG. 5 is a flowchart showing a control procedure of time information obtaining processing.

FIG. 5 is a flowchart showing a control procedure of the time information obtaining processing performed in the electronic timepiece 1 of the present embodiment.

The time information obtaining processing is processing performed by the CPU 41 when called automatically at a preset time or called by an input operation on the operation section 48 by the user.

When the time information obtaining processing is started, the CPU 41 operates the radio wave receiving section 34 to start reception and demodulation of the standard radio wave (step S101). Next, the CPU 41 obtains the demodulated signal from the radio wave receiving section 34, and detects and defines the second synchronizing point from the wave pattern (step S102). As the method of defining the second synchronizing point, it is possible to use various well known methods. For example, in the time information obtaining processing, the CPU 41 adds digital data sampled at a temporal resolution (for example, 64 Hz) high enough for the length (1 second) of each code for each piece of data at a same phase in a cycle of 1 second. As a result, the CPU 41 is able to identify the point in which the change of the intensity of amplitude of the signal from the low level to the high level is most drastic as the second synchronizing point. The sampled digital data can be binary data or multi-valued data.

When the second synchronizing point is identified, the CPU 41 sequentially identifies the code from the signal of each second. The CPU 41 detects the point where the code "P" continues two times and defines the timing of the start of 0 second of each minute (minute synchronizing point) (step S103). Various known methods can be used as the identifying method of the code. For example, in the time information obtaining processing, the CPU 41 obtains the average amplitude intensity of each term by adding and averaging data of 0.2 seconds to 0.5 seconds from the second synchronizing point and data of 0.5 seconds to 0.8 seconds from the second synchronizing point among the data sampled at the above high temporal resolution. Then, the CPU 41 identifies the code based on whether the average amplitude intensity is closer to the low level or the high level.

When the minute synchronizing point is detected, the CPU 41 judges whether a predetermined number of frames (here, 5 frames) of the code string data is obtained (step S104). When it is judged that a predetermined number of frames of code string data is not yet obtained (step S104, "NO"), the CPU 41 obtains the signal of the next second, identifies the code, and stores the identified code associated with the value of the second in the code data storage section 43a (step S105). Then, the processing of the CPU 41 returns to step S104.

When it is judged that a predetermined number of frames of code string data is obtained (step S104, "YES"), the CPU 41 judges the majority among the three codes identified in each second excluding the data portion showing the digit of the one minute unit digit (5 seconds to 8 seconds) and the data portion showing the minute parity (37 seconds) for the code string data of the first 3 frames from the code string data of the obtained 5 frames. This majority judgment includes the data portion (36 seconds) showing the hour parity. Then, the CPU 41 obtains the majority time information based on the code string data generated by selecting the code of the majority (step S106). The CPU 41 calculates the degree of match between the code string of 12 codes consisting of the 4 codes showing the one minute unit digit identified in 3 frames arranged in the order of reception and the code string of 10 patterns stored in the model array storage section 42a. Based on the 3 values of the one minute unit digit shown by the matching or most similar code string, the CPU 41 sets the value of the one minute unit digit of the obtained time information.

The processing of step S106 can be performed for the code each time the code of the third frame is identified, or the code string each time the code string of each digit in the time information of the third frame is obtained. Alternatively, the processing of step S106 can be performed parallel with the processing of receiving the signal and identifying the code of the remaining 2 frames.

Based on the identified value of the one minute unit digit of the 3 frames, the CPU 41 corrects the minute parity data of each frame and obtains the ten minute unit digit parity value (step S107). Specifically, the CPU 41 refers to the parity correction table 42b, and obtains each parity value of the one minute unit digit for the value of the one minute unit digit of each identified frame. When the one minute unit digit parity value is "1", the value of the minute parity of the frame is inverted, and when the one minute unit digit parity value is "0", the value of the minute parity is maintained. Then, the CPU 41 performs majority processing similar to the processing of step S106 for the obtained 3 values (codes) of the ten minute unit digit parity.

The CPU 41 calculates the ten minute unit digit parity based on the data of the majority code string decided in the processing of step S106 (step S108). Here, the CPU 41 can also calculate the value of the hour parity.

The CPU 41 judges whether the ten minute unit digit parity value obtained in the processing of step S107 and the ten minute unit digit parity value calculated in the processing of step S108 match (step S109). The CPU 41 judges whether the hour parity value decided in the processing of step S106 and the hour parity value obtained in the processing of step S108 match. When it is judged that either one does not match (step S109, "NO"), the processing by the CPU 41 advances to step S112, and after resetting (erasing) the stored data, the CPU 41 returns the processing to step S104.

When it is judged that both the ten minute unit digit parity value and the hour parity value match (step S109, "YES"), the CPU 41 obtains the time information from the code array of the remaining 2 frames, and the CPU 41 confirms the consistency between the obtained two pieces of time information and majority time information obtained in the processing of step S106 (step S110). Next, the CPU 41 judges whether the result of the confirmation shows that there is consistency (step S111). When it is judged that there is no consistency (step S111, "NO"), the CPU 41 advances the processing to step S112.

Here, the CPU 41 can erase the code string data of all 5 frames or if the code string data of only 1 frame is not consistent, the CPU 41 can erase only the code string data of the frame which is not consistent. Alternatively, the CPU 41 can erase the code string data of the oldest frame.

When it is judged that there is consistency (step S111, "YES"), the CPU 41 sets the present time based on the time information with consistency, and the present time of the time keeping circuit 46 is overwritten and calibrated (step S113). Then, the CPU 41 ends the time information obtaining processing.

As described above, the electronic timepiece 1 of the present embodiment includes an antenna 33 and a radio wave receiving section 34 which receive a standard radio wave of a long wavelength band. The electronic timepiece 1 demodulates the received radio wave to generate a signal, and the codes of 3 frames are identified with the signal. The parity bit regarding the code of the one minute unit digit which changes each minute is subtracted from the identified minute parity value to calculate the ten minute unit digit parity and the majority is decided. Separately, the ten minute unit digit parity is calculated from the ten minute unit digit code of the decided majority code string. Then, the match between the ten minute unit digit parity obtained by the above two methods is confirmed. Consequently, when the time information is obtained using the data of the plurality of frames, it is possible to effectively perform parity check using the parity bit in which the value changes among the plurality of frames, and to easily confirm the accuracy of the time information.

Similarly, regarding the ten minute unit digit parity calculated by subtracting the one minute unit digit parity from the minute parity, the parity bit is decided by majority among the parity bit obtained for the plurality of frames. Therefore, even if there is some mixed noise, accurate parity bit can be obtained. Consequently, the parity check can function effectively.

The ten minute unit digit parity is directly obtained from the code showing the ten minute unit digit in the majority code string. Therefore, the ten minute unit digit parity hardly receives influence of the mixed noise and accurate parity bit can be obtained. Consequently, the parity check can function effectively.

Specifically, when the one minute unit digit is added to the ten minute unit digit within the 3 minutes of the data obtained, the processing is performed by adjusting to the term which does not include adding to the ten minute unit digit. With this, the check using the ten minute unit digit parity becomes effective. Moreover, by limiting the processing to the one minute unit digit, troublesome processing is avoided. Therefore, time information can be obtained by easy processing.

As described above, the code is decided by majority from pieces of data obtained in the same position among the obtained data of the plurality of frames. Therefore, even if noise is mixed so that accurate data cannot be obtained for all frames, accurate time data can be obtained.

In this case, the code string showing the value of the one minute unit digit of 3 frames which change each minute is compared with the model code string which may be possible as the order of the codes for the 3 minutes. The one minute unit digit is obtained from the code string with the highest degree of match. Therefore, similar to the effect of deciding by majority the codes of the portion which do not change, even if there are some inaccurate identifications of the codes due to the noise, the one minute unit digit value can be obtained accurately and securely.

According to the electronic timepiece 1 which performs processing to obtain time information, it is possible to reliably obtain accurate time information easily without performing processing for an amount of time unnecessarily long, while suppressing the increase of consumed energy.

The present invention is not limited to the above embodiments, and various changes can be made.

The above embodiment describes an example which receives a radio wave of JJY. However, when the radio wave of DCF77 and MSF which include parity data are received, similar processing can be performed. In this case, with MSF, the parity value of 14 codes of the hour data and the minute data are output. Therefore, the parity value subtracting the one minute unit digit parity value becomes the parity value based on the code of the ten minute unit digit, the one hour unit digit and the ten hour unit digit. Therefore, the parity value which is the target of confirmation of consistency is calculated based on the code of the ten minute unit digit, the one hour unit digit, and the ten hour unit digit.

When the standard radio wave of MSF is received, the processing of decision by majority, etc. becomes complicated for the plurality of pieces of frame data in the term where the one minute unit digit is added to the ten minute unit digit. However, the accuracy of the data can be confirmed by calculating a portion parity based on only the one hour unit digit and the ten hour unit digit and performing processing similar to the above processing.

According to the above described embodiment, the codes are decided by majority of the codes in 3 frames, however, the number of frames can be another number. In this case, more preferably, the number of frames is set to an odd number, however the number of frames can be an even number. Moreover, for example, even if the number is set to 5 frames, when all of the results of the majority are decided by the data of 4 frames, the processing can be set to be terminated at 4 frames.

The decision is not limited to a simple majority of 3 frames as described above. When the noise level or the received signal level is different among frames, it is possible to obtain the weighted average and then to binarize the value.

Moreover, according to the above described embodiment, the code of the ten minute unit digit is decided by the majority, and then the ten minute parity is calculated based on the decided codes. However, the ten minute parity can be calculated with the codes of the ten minute unit digit of each frame, and then the ten minute parity can be decided by the majority.

According to the above described embodiment, the ten minute parity is calculated from the minute parity using the parity correction table 42b, however, the value can be calculated by normal procedures with each bit data or processing can be performed in the program without holding a table separately.

The specific details such as the configuration or the control procedures as described above can be suitably changed without leaving the scope of the invention.

Although various exemplary embodiments have been shown and described, the invention is not limited to the embodiments shown. Therefore, the scope of the invention is intended to be limited solely by the scope of the claims that follow and its equivalents.

The entire disclosure of Japanese Patent Application No. 2012-269216 filed on Dec. 10, 2012 including specification, claims, drawings and abstract are incorporated herein by reference in its entirety.

What is claimed is:

1. A time information obtaining device which receives a radio wave including time information to obtain the time information from the radio wave, the time information obtaining device comprising:
a code identifying section which identifies each code of each of code strings in the received radio wave;
a first portion parity calculating section which calculates a portion parity from each of a predetermined number of the code strings, the predetermined number of the code strings being 3 or more, by subtracting (i) a parity bit of a variable code, which is contained in a predetermined code string portion of a respective one of the code strings and which may change among the predetermined number of the code strings, from (ii) a parity bit included in the predetermined number of the code strings;
a first portion parity deciding section which decides a first portion parity based on a predetermined number of the portion parities calculated from the predetermined number of the code strings by the first portion parity calculating section;
a second portion parity deciding section which obtains a second portion parity from an invariable code other than the variable code among codes of the predetermined code string portions of each of the predetermined number of the code strings; and
a parity confirming section which confirms a match between the first portion parity decided by the first portion parity deciding section and the second portion parity obtained by the second portion parity deciding section.

2. The time information obtaining device of claim 1, wherein the first portion parity deciding section decides the first portion parity by majority of the portion parities calculated by the first portion parity calculating section.

3. The time information obtaining device of claim 2, wherein the second portion parity deciding section decides the invariable code by majority from among invariable codes identified in a same position of each of the predetermined number of the code string portions and calculates the second portion parity based on the decided invariable code.

4. The time information obtaining device of claim 3, wherein the variable code is a code string portion showing time information regarding a one minute unit digit of time.

5. The time information obtaining device of claim 4, wherein when a time shown by the identified codes of the predetermined number of the code strings includes a change of a ten minute unit digit, the code identifying section resets the predetermined number of code strings so as not to include the change in the ten minute unit digit.

6. The time information obtaining device of claim 3, further comprising a majority deciding section which decides a code for each code, excluding the variable code and the parity code, included in the predetermined number of the code strings and identified by the code identifying section, the code being decided by majority from among a predetermined number of codes identified in a same position of the predetermined number of the code strings.

7. The time information obtaining device of claim 2, wherein the variable code is a code string portion showing time information regarding a one minute unit digit of time.

8. The time information obtaining device of claim 7, wherein when a time shown by the identified codes of the predetermined number of the code strings includes a change of a ten minute unit digit, the code identifying section resets the predetermined number of code strings so as not to include the change in the ten minute unit digit.

9. The time information obtaining device of claim 2, further comprising a majority deciding section which decides a code for each code, excluding the variable code and the parity code, included in the predetermined number of the code strings and identified by the code identifying section, the code being decided by majority from among a predetermined number of codes identified in a same position of the predetermined number of the code strings.

10. The time information obtaining device of claim 1, wherein the second portion parity deciding section decides the invariable code by majority from among invariable codes identified in a same position of each of the predetermined number of the code string portions and calculates the second portion parity based on the decided invariable code.

11. The time information obtaining device of claim 10, wherein the variable code is a code string portion showing time information regarding a one minute unit digit of time.

12. The time information obtaining device of claim 11, wherein when a time shown by the identified codes of the predetermined number of the code strings includes a change of a ten minute unit digit, the code identifying section resets the predetermined number of code strings so as not to include the change in the ten minute unit digit.

13. The time information obtaining device of claim 10, further comprising a majority deciding section which decides a code for each code, excluding the variable code and the parity code, included in the predetermined number of the code strings and identified by the code identifying section, the code being decided by majority from among a predetermined number of codes identified in a same position of the predetermined number of the code strings.

14. The time information obtaining device of claim 1, wherein the variable code is a code string portion showing time information regarding a one minute unit digit of time.

15. The time information obtaining device of claim 14, wherein when a time shown by the identified codes of the predetermined number of the code strings includes a change of a ten minute unit digit, the code identifying section resets the predetermined number of code strings so as not to include the change in the ten minute unit digit.

16. The time information obtaining device of claim 15, further comprising a majority deciding section which decides a code for each code, excluding the variable code and the parity code, included in the predetermined number of the code strings and identified by the code identifying section, the code being decided by majority from among a predetermined number of codes identified in a same position of the predetermined number of the code strings.

17. The time information obtaining device of claim 14, further comprising a majority deciding section which decides a code for each code, excluding the variable code and the parity code, included in the predetermined number of the code strings and identified by the code identifying section, the code being decided by majority from among a predetermined number of codes identified in a same position of the predetermined number of the code strings.

18. The time information obtaining device of claim 1, further comprising a majority deciding section which decides a code for each code, excluding the variable code and the parity code, included in the predetermined number of the code strings and identified by the code identifying section, the code being decided by majority from among a predetermined number of codes identified in a same position of the predetermined number of the code strings.

19. The time information obtaining device of claim 1, further comprising a variable code deciding section which decides a variable code string based on a degree of match between a model array of possible variable code strings and a code string included in the predetermined number of code strings, the variable code string including an array if a predetermined number of variable codes identified by the code identifying section arranged in order.

20. A radio-controlled timepiece comprising:
the time information obtaining device according to claim 1;
a time keeping section which counts a present time;
a time calibrating section which calibrates the present time counted by the time keeping section based on the time information obtained by the time information obtaining device; and
a time display section which displays in a predetermined format the present time counted by the time keeping section and calibrated by the time calibrating section.

* * * * *